United States Patent
Clarke (10) Patent No.: US 11,733,139 B2
(45) Date of Patent: Aug. 22, 2023

(54) SYSTEM AND METHOD FOR DETERMINING SAG PROPENSITY

(71) Applicant: Schlumberger Technology Corporation, Sugar Land, TX (US)

(72) Inventor: Andrew Clarke, Haslingfield (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/664,922

(22) Filed: May 25, 2022

(65) Prior Publication Data

US 2022/0381663 A1 Dec. 1, 2022

Related U.S. Application Data (60) Provisional application No. 63/193,380, filed on May 26, 2021.

(51) Int. Cl.
*G01N 15/04* (2006.01)
*G01N 11/16* (2006.01)
*G01N 11/04* (2006.01)

(52) U.S. Cl.
CPC ........... *G01N 11/162* (2013.01); *G01N 11/04* (2013.01)

(58) Field of Classification Search
CPC ...... G01N 11/162; G01N 11/04; G01N 11/00; G01N 15/04; G01N 15/14
USPC ............. 73/53.01, 53.3, 54.25, 61.41, 61.63, 73/61.65, 64.41
See application file for complete search history.

(56) References Cited

U.S. PATENT DOCUMENTS

| 4,524,610 | A  | 6/1985  | Fitzgerald et al. |
| 7,845,212 | B1 | 12/2010 | Bi |
| 8,938,380 | B2 | 1/2015  | Jamison et al. |

FOREIGN PATENT DOCUMENTS

GB 2586649 A 3/2021

OTHER PUBLICATIONS

Kamp et al., Universal behaviour in the mechanical properties of weakly aggregated colloidal particles, The Royal Society of Chemistry, Soft Matter, 2009, col. 5, pp. 2438-2447.

(Continued)

*Primary Examiner* — Robert R Raevis (57) ABSTRACT

Sag propensity of a fluid can be determined by applying an oscillatory strain at an amplitude in excess of a linear region and below a yield strain of the drilling fluid. This may include use of medium amplitude oscillatory shear (MAOS), from which an elastic modulus of the fluid is determined. The elastic modulus may be determined over time, from which a time to reach maximum elastic modulus can be determined. The time to reach maximum elastic modulus is then converted or correlated to a drilling fluid sag propensity for the drilling fluid either in absolute terms or in relation to base or comparison fluids. Such an evaluation can be performed using a torsional resonance device in which the oscillatory strain is controllable so as to be maintained relatively constant during the measurement.

17 Claims, 4 Drawing Sheets

(56) References Cited

OTHER PUBLICATIONS

Van Den Ende, et al. Driven torsion pendulum for measuring the complex shear modulus in a steady shear flow, Rheologica Acta, vol. 31, No. 5, 1992, pp. 194-205.
Duvarci et al., The SAOS, MAOS and LAOS behavior of a concentrated suspension of tomato paste and its prediction using the Bird-Carreau (SAOS) and Giesekus models (MAOS-LAOS), Journal of Food Engineering, vol. 208, 2017, pp. 77-88.
Hydramotion Inc., Viscolite Portable Viscometer | Hand-held Viscometer, accessible at https://hydramotion.com/en/products/viscolite, 2022.

SYSTEM AND METHOD FOR DETERMINING SAG PROPENSITY

CROSS-REFERENCE TO RELATED APPLICATIONS

This application claims the benefit of, and priority to, U.S. Patent Application No. 63/193,380, filed May 26, 2021 and titled "System and Method for Determining Sag Propensity", which application is expressly incorporated herein by this reference in its entirety.

BACKGROUND

When drilling a wellbore, drilling fluid (often referred to as "mud" or "drilling mud") is pumped through the drill string and exits the drill bit via several small nozzles. Cuttings generated at the dill bit are carried by the flow to surface via the annulus around the drill string. The drilling fluid may include a combination of gases, liquids, and solids (e.g., foams, solid suspensions, emulsions, etc.), and may be used for a variety of purposes, including carrying drilled cuttings to the surface and providing hydrostatic stability within the wellbore.

For stability, the fluid pressure in an unlined wellbore is generally greater than that in the formation being drilled so that fluid does not flow into the wellbore from the formation. However, the fluid pressure also should be less than that which would fracture the rock. The hydrostatic pressure is adjusted by adding weighting agents to the fluid, which can include high-density minerals such as barite.

SUMMARY

An embodiment of the present disclosure relates to estimating or determining sag propensity of a fluid, and includes providing oscillatory strain to a fluid, and within a MAOS regime. Using the oscillatory strain, an elastic modulus is determined as a function of time, and the elastic modulus or a time to reach peak elastic modulus is correlated with sag propensity.

Another example method for evaluating sag propensity includes shearing a drilling fluid and providing an oscillatory strain at an amplitude in excess of a linear region and below a yield strain of the drilling fluid. An elastic modulus of the drilling fluid is determined as a function of time, and from the elastic modulus as a function of time, a time to reach maximum elastic modulus is determined. The time to reach maximum elastic modulus is converted or correlated to a drilling fluid sag propensity for the drilling fluid.

An example measurement device in accordance with embodiments of the present disclosure includes a driven torsional pendulum. The pendulum can include a shaft and a bob. The bob is designed to be immersed in a fluid and is selectively controllable. For instance, at least a displacement amplitude at a surface of the bob at resonance may be controlled. An optional pre-shearing mechanism, that is independently controllable, is also included and can cause the fluid adjacent the torsional pendulum bob to be sheared at a high rate. Using such a device, strain amplitude imposed on the fluid can be maintained a constant value. From use of the device, a resonant frequency and Q factor of resonance can be measured, and from such measurements, a complex modulus determined.

This summary is intended to provide an illustrative description of some aspects of the present disclosure, but is not exhaustive, neither should it be interpreted as describing any features that are key, essential, or which form an essence of the disclosure.

BRIEF DESCRIPTION OF THE DRAWINGS

Certain embodiments of the disclosure will hereafter be described with reference to the accompanying drawings, wherein like reference numerals denote like elements. It should be understood that the accompanying figures illustrate the various implementations described herein and are not meant to limit the scope of various technologies described herein. Further, unless drawings are indicated as being schematic in nature, they are to be considered to scale for certain embodiments, but the scale is not limiting as different scales may be used in other embodiments unless the appended claims require a certain scale.

DETAILED DESCRIPTION

Embodiments of the present disclosure relate to determining the sag propensity particles in a fluid. More particularly, some embodiments relate to determining the sag propensity for solid particles in a drilling fluid. More particularly still, some embodiments relate to methods and systems for efficiently determining the sag propensity using non-linear oscillation measurements.

Over time, particles or solids suspended in a fluid tend to settle. In a downhole environment using drilling fluid with suspended particles, this phenomenon can be referred to as "sag", and relates to the tendency of the solid particles and suspended drilling cuttings to settle due to gravity and/or as a result of gel collapse/breakdown due to aging (e.g., poroelastic collapse or syneresis). This may result in pressure gradients within the wellbore as the solid materials move to the bottom of a vertical wellbore or the bottom side of an inclined or horizontal wellbore. As sag occurs and the rheological properties of the drilling fluid change, the drilling fluid becomes stratified, which can create a pressure imbalance along the length of the wellbore. In some cases, increased density and mud weight in some strata can lead to damage in a well, or unexpected and potentially dangerous pressure gradients in some formation zones. Additionally, stratified drilling fluids and pressure imbalances can accelerate further sag and lead to stuck pipe, lost circulation, or stick slip events, or can result in an errant drill path.

Dynamic and static sag both have been, and continue to be, a chronic challenge in the drilling industry, and complete solutions have not yet been produced. For instance, during drilling operations, sag can be detected by measuring and comparing the weight of the fluid as it leaves the wellbore and the weight of the fluid entering the wellbore. However, this includes long delays, which significantly affects the accuracy of the method, and may delay sag mitigation measures. Further, once the drilling fluid is in the wellbore and sag occurs, the undesirable event has already happened.

Even if mitigation measures can be a partial remedy, the wellbore quality, tool efficiency, or operational safety may have already been compromised.

Instead of detecting and mitigating sag at the time of the event, controls may instead be put in place to determine the propensity of sag to occur. Upon obtaining a better understanding of the likelihood that sag will occur, lower sag propensity fluids that still provide desired rheological properties may be used. This may be done, for instance, by using a direct, phenomenological measurement. For static sag, this can include filling a pressure cell, heating the pressure cell to a desired temperature, and then waiting a sufficient period of time (often seven days). At the end of the time period, the pressure cell can be opened and the density change at the bottom of the pressure cell can be measured.

Instead of obtaining a direct measurement that relies on an extended waiting period, aspects of the present disclosure relate to a physics-based analysis of the drilling fluid. Such an approach has the possibility of accelerating measurements and enabling a significantly quicker assessment of the sag propensity. For instance, the determination may be made in less than a day, less than six hours, or even in less than one hour. This offers the ability to obtain a sag propensity measurement potentially 100 times faster than a direct measurement with a sag period of seven days. As a result, particular drilling fluid formulations for may be evaluated more rapidly, thus allowing more formulations to be tested for a particular application. Moreover, the physics-based approach may even use equipment that can take measurements at temperatures and pressures that allow the equipment to be robust enough to be field deployable.

Figure 1:
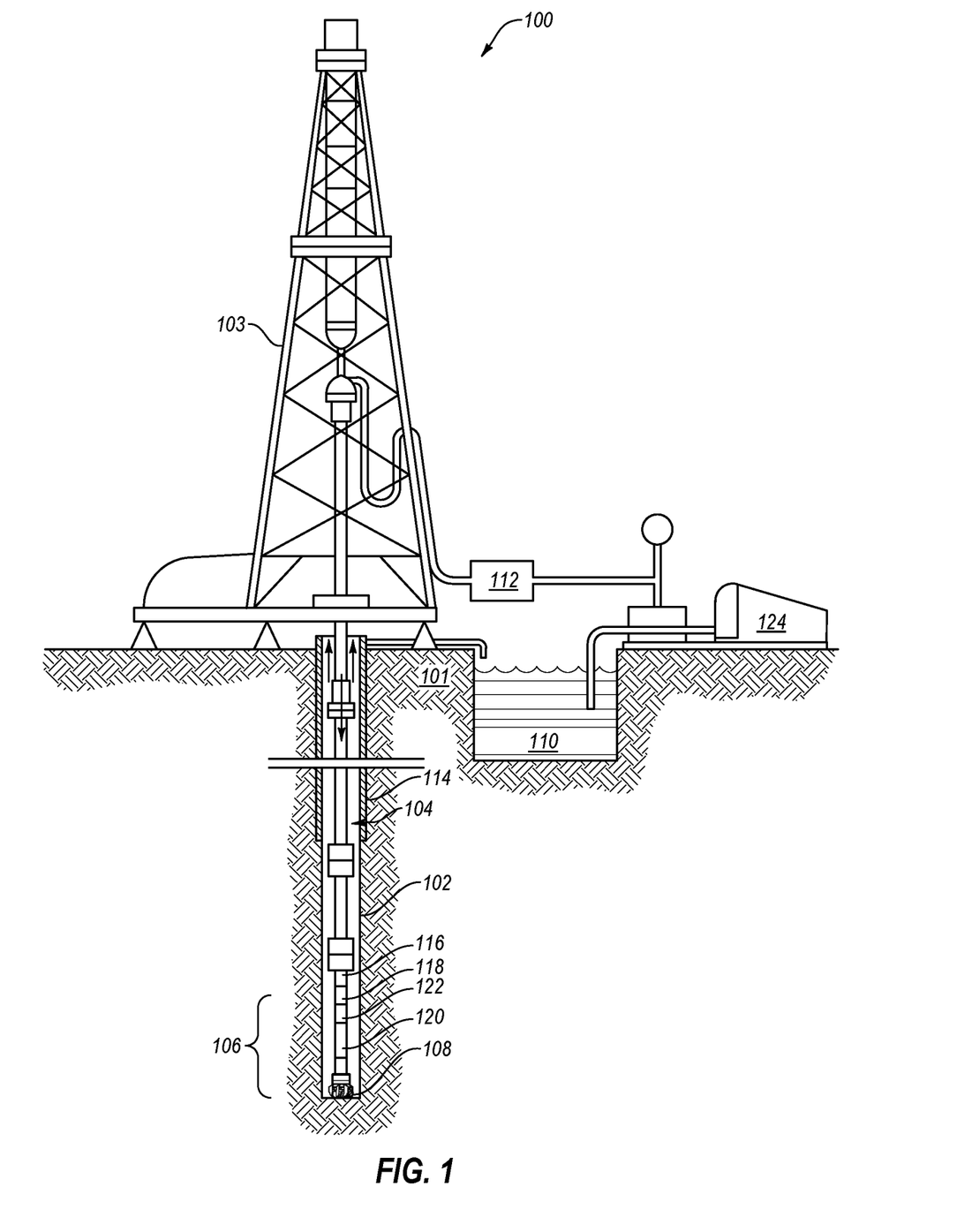
FIG. 1 is a schematic illustration of an example drilling system for use in drilling a wellbore, according to some embodiments of the present disclosure.

Referring generally to FIG. 1, an example of a wellsite system 100 for which embodiments described herein may be employed is illustrated. The wellsite may be onshore or offshore. In this example, a wellbore 102 is formed in a subsurface formation 101 by drilling. The method of drilling to form the wellbore 102 may include, but is not limited to, rotary and directional drilling. A drill string 104 is suspended within the wellbore 102 and has a bottom hole assembly ("BHA") 106 that includes a drill bit 108 at its lower end.

Some embodiments of a surface system include a platform, derrick, or rig 103 positioned over the wellbore 102. An example of assembly 100 includes a rotary table, a kelly, a hook, and a rotary swivel. The drill string 104 is rotated by the rotary table or top drive and energized by a suitable system which engages the kelly at the upper end of the drill string 104. The drill string 104 is suspended from the top drive or a hook attached to a traveling block, and through the kelly and the rotary swivel which permits rotation of the drill string 104 relative to the surface system.

Some embodiments of the surface system also include a drilling fluid 110, e.g., drilling mud, stored in a pit or tank at the wellsite. A pump 112 delivers the drilling fluid 110 to the interior of the drill string 104 (e.g., via one or more ports in a swivel), causing the drilling fluid 110 to flow downwardly through the drill string 104. The drilling fluid exits the drill string 104 via one or more ports in the drill bit 108, circulation sub, or other tool, and then circulates upwardly through the annulus region between the outside of the drill string 104 and the wall of the borehole 102 or casing 114. In this manner, the drilling fluid 110 lubricates the drill bit 108 and carries formation cuttings and particulate matter up to the surface as it is returned to the pit for recirculation.

The illustrated embodiment of bottom hole assembly 106 includes one or more logging-while-drilling ("LWD") modules 116, one or more measuring-while-drilling ("MWD") modules 118, one or more directional drilling modules 120 (including motors), other tools 122, and the drill bit 108. These tools are optional and can include additional or fewer tools or modules. For instance, a mill, reamer, or other tool may be used as, or in addition to, the drill bit 108, or the MWD or LWD may be used without the directional drilling module 120, or vice versa.

The LWD 116 may be housed in any type of drill collar, and includes capabilities for measuring, processing, and storing information, as well as for communicating with the surface equipment. The LWD module 116 also may include pressure measuring device and one or more logging tools.

The MWD module 118 also may be housed in a type of drill collar, and includes one or more devices for measuring characteristics of the drill string 104 and drill bit 108. The MWD module 118 also may include one or more devices for generating electrical power for the downhole system. In some embodiments, the power generating devices include a mud turbine generator powered by the flow of the drilling fluid 110. In other embodiments, battery or other power systems may be employed to generate power. The MWD module 118 also may include one or more of the following types of measuring devices: a weight-on-bit measuring device; a torque measuring device; a vibration measuring device; a shock measuring device; a stick-slip measuring device; a direction measuring device; an inclination measuring device; a mud density measuring device; or a mud weight or mud composition measuring device. These measuring devices may be used individually or in various combinations.

In an operational example, the wellsite system 100 of FIG. 1 is used in conjunction with surface equipment that may be used for various purposes, including steering the drill string 104, connecting and disconnecting drill pipe segments as the drill string 104 is lowered or raised, measuring surface or downhole conditions, and the like. This equipment may include the use of computing systems 124 located at the wellsite 100 or remote from the wellsite (e.g., connected by a communication link with the wellsite 100). In some embodiments, the computing systems 124 may include, or be connected to, mud testing equipment. Such equipment may be used to evaluate the properties and composition of the drilling fluid 110 and may include interfaces to receive the results of manual or other tests performed on the drilling fluid 110. In response, to tests or evaluation of the drilling fluid 110, additives or other materials may be added to the drilling fluid 110, additional separation or remedial processes may be performed, or the like, in order to produce drilling fluid 110 with desired properties.

As discussed, one aspect of some embodiments of the present disclosure, is that a physics-based assessment of sag propensity of drilling fluid 110 may be determined quickly, and may therefore be used in a variety of environments. Thus, embodiments of methods, devices, and systems for determining sag propensity can be located at the wellsite (e.g., using evaluation equipment optionally connected to the computing system 124), even where the extended period of time used to obtain a direct phenomenological test result may have limited use at the field location, and thus are replaced by time-density traces that indicate if sag has occurred, which is a potentially dangerous situation as it doesn't operate predictively to indicate if sag is likely to occur in the future to allow avoidance of the situation.

Nevertheless, embodiments of the present disclosure may also be used in a laboratory setting, or in other locations. Moreover, such methods, devices, and systems are not limited to use exclusively with drilling fluid, and may be used in other environments or applications where it is desired to determine the sag or settling propensity of solids or particles within a fluid.

The fluid 110 may have a variety of formulations, and can generally be categorized as a water-based mud ("WBM"), an oil-based mud ("OBM"), or a synthetic-based mud ("SBM"). Sag can occur differently in different types of fluids. For instance, in an OBM, sag can occur within a gel or poroelastic collapse process in a stationary mud, with a time delay observed before appearance of free oil and a concomitant increase in the density of the mud at the bottom of a test cell. In practice, a measurement that is sensitive to changes in gel properties occurring before the macroscopic collapse (e.g., before the time delay is completed) can be predictive of the possibility of future sag, rather than simply report that sag has occurred. Thus, such a prediction can allow a mud engineer to take pre-emptive action before macroscopically observable changes occur.

Figure 2:
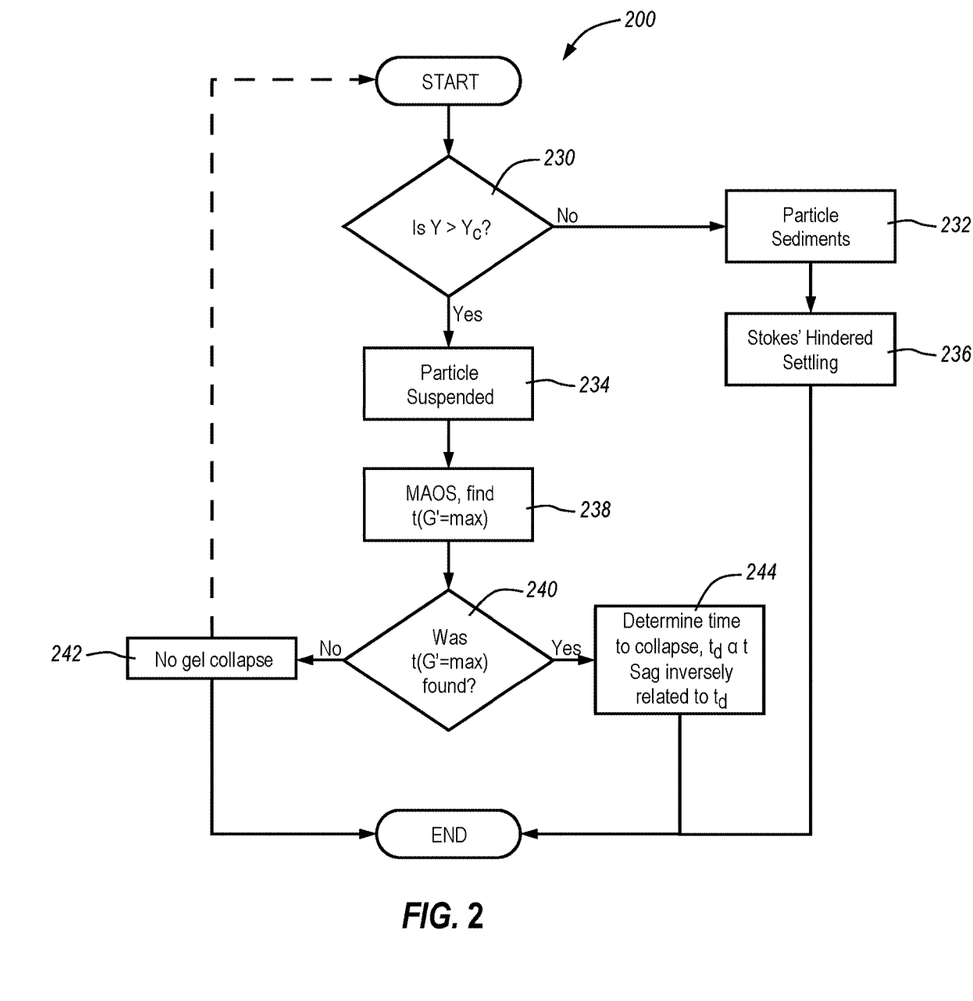
FIG. 2 is flowchart of a method for assessing sag propensity, according to embodiments of the present disclosure.

Turning now to FIG. 2, a method 200 is shown as a flow chart for assessing the propensity of static sag. In the method 200, the method begins, which may include pre-shearing the fluid. For instance, fluid may be sheared at a shear rate (e.g., a high shear rate) for a period of time, and then stopped. The pre-shear period may be any suitable period, and in some embodiments is between 10 seconds and 1 hour (e.g., 15 seconds, 1 minute, 5 minutes, 10 minutes, 30 minutes, 1 hour, or any period therebetween). The pre-shear period may be fixed or variable. For instance, in one embodiments, pre-shearing is performed for a period of time sufficient to reach a determined initial state of the fluid. This may allow, for example, comparisons of different fluids which are pre-sheared to the same or similar initial state. In some embodiments, pre-shear may be limited in time as extended pre-shear may cause detrimental effects to occur.

Before or after pre-shearing, an initial determination of the significance of sedimentation in the drilling fluid is made at 230. In this particular embodiment, this determination can be made using a Y parameter, which can be dimensionless number representing a ratio of forces as shown in Equation 1:

$$Y = \frac{3\sigma_y}{2a\Delta\rho g} \quad (1)$$

where $\sigma_y$ is the yield stress of the drilling fluid, a is particle size (e.g., based on surface area or radius), $\Delta p$ is a difference between particle and fluid density (e.g., the difference relative to the density of the continuous phase of the fluid), and g is gravity. The yield stress may be measured for a particular fluid, and changes over time. In one example, the yield stress may be a measurement of the amount of strength needed to break the gel, and can be the y-intercept on a flow curve that plots the shear rate of the fluid (x axis) against the stress (y axis). The denominator in Equation 1 is reflective of the gravity force of the solid particle (e.g., barite). The particle size and gravity values would be generally constant over time, although the $\Delta p$ value may change, such as when the oil/water ratio of the continuous phase changes. In practice, however, it may be that changes in the $\Delta p$ value are quite small with observed changes to the yield stress value. As a result, the changes to the Y parameter may largely be reflective of yield stress changes.

The Y parameter may be calculated and compared against a critical Y parameter ($Y_c$) at 238, in order to determine whether gravity or fluid yield stress is dominant on the particles in the fluid. This can be a measure of how well gravity will move the particle in the fluid. For instance, where gravity is the dominant force (e.g., $Y<Y_c$), it may be determined at 232 that the particles are expected to sediment within the fluid. In contrast, where yield stress is the dominant force (e.g., $Y>Y_c$), it may be determined at 234 that the particles are expected to be suspended within the fluid. Thus, a large Y parameter is indicative of a larger shear stress supporting the particle in the fluid, and a small Y parameter reflects gravity is larger.

For simplicity, the $Y_c$ value may be set to a value of 1, which provides a suitable ratio for measuring the relative scale of the forces acting on the particle in a fluid. It will be appreciated, however, that this value may vary. For instance, the gel microstructure within a fluid can have different forms and behave in different ways. As a result, the $Y_c$ value can also vary to reflect how the microstructure supports the solid particles. Thus, in some embodiments, $Y_c$ may be less than 1 or greater than 1. For instance, $Y_c$ may be determined based on the fluid microstructure and may be a value having a lower value, an upper value, or lower and upper values including one of more of 0.4, 0.5, 0.6. 0.7, 0.8, 0.9, 1.0, 1.1, 1.1, 1.2, 1.3, 1.4, 1.5, 1.6 or values therebetween. For instance, $Y_c$ may be between 0.5 and 1.5 in one non-limiting example of the present disclosure.

It will also be appreciated that Equation 1 is illustrative, and other equations may be used to evaluate whether gravity or suspension forces are dominant on a particle. For instance, measurements of viscosity, modulus, gel strength, or yield point (e.g., low shear yield point) may be used.

When the solids are determined at 232 to be sedimenting rather than being suspended, the method 200 may be used to determine that sag is not the primary settling activity. For instance, Stokes settling (or Stokes' hindered settling) is occurring at 236. This determination may represent that the particle in the fluid is too heavy compared to the yield stress, which allows the particle to break the gel and settle. Thus, when the value of the Y parameter is less than 1 (or another $Y_c$ value based on the microstructure), it may be determined settling occurs.

If, however, the Y parameter is greater than 1 or other $Y_c$ value, the particle cannot settle through the fluid and solids are determined at 234 to be suspended, a dynamic oscillatory shear test may be used at 238 to further investigate the gel strength and collapse (syneresis) of the fluid that leads to sag occurrence.

Dynamic oscillatory shear tests can be performed to measure the elastic modules of the gel as a function of time. In such tests, the elastic modulus will exhibit a peak somewhat before the collapse starts. This time can be proportional to, but significantly short than, the time delay until the collapse begins. As a result, the peak position can be a predictive indicator measurement.

The dynamic oscillatory shear test can produce a linear viscoelastic response from the fluid, or can produce a non-linear material response. Tests that produce linear responses can be referred to as small amplitude oscillatory shear (SAOS) tests, while tests that produce measurable non-linear responses can include large amplitude oscillatory shear (LAOS) tests. A transition region also exists between SAOS and LAOS, which includes medium amplitude oscillatory shear (MAOS) tests. In the MAOS regime, a particular scaling behavior can be observed for a third harmonic contribution. For instance, the $I_{3/1}$ magnitude in the MAOS region may be between $3\times10^{-4}$ and $1\times10^{-2}$. In the LAOS region, however, $I_{3/1}$ may be higher, including up to $10^{-1}$. In the MAOS region, the strain amplitude also generally ranges from about 0.1 to 1, although this range can depend on other factors, including the excitation frequency and material characteristics.

The elastic modulus can be measured using SAOS tests, and although the small perturbations provide a suitable measurement at the time the peak occurs, the time to obtain the peak is impractically long. Increasing the amplitude of the perturbation so that the deformation is weakly non-linear using MAOS tests can allow a peak to be found in much shorter time periods.

Thus, to determine the viscoelastic response of the fluid, a MAOS test may be performed on the fluid. For instance, in such a test, the oscillatory shear can apply a strain under a stress in periodic manner (e.g., as a sinusoidal wave) for a period of time such as 30 minutes, 60 minutes, 90 minutes, or 120 minutes. Shorter or longer tests could also be performed. For the test, a modulus (G*) can be used to relate the stress to the strain, and may be determined either by ignoring harmonics after the first, or by considering all harmonics (or some subset of harmonics). A phase shift of the oscillatory shear may have a produce a complex modulus (G*) including a real, elastic modulus portion (G'), and an imaginary portion (G").

To provide a consistent measurement, the amplitude of the strain oscillation can exceed a linear region (and thus exceed about 1% strain for oil-based mud) and less than the strain required to break the gel (e.g., about 10% for oil-based mud). In some cases, the strain is significantly less than the strain that would break the gel. In an illustrative embodiment, the strain amplitude is between 1% and 7% strain for the gel. In another embodiment, the strain amplitude is between 1% and 5% or between 2% and 4% of the strain for the gel. For instance, the strain amplitude may be about 3%. In other embodiments, higher or lower strain amplitudes may be used. Whatever the strain amplitude that is used in the test at 238, the MAOS test amplitude may be controlled to be constant so that measurements can be compared.

As the test is performed, the controlled strain oscillates at a frequency over a set of cycles, and the G' value may increase to reach a peak. Also at 238, the time at which the G' is a maximum (i.e., t(G'=max)) may be found. In some aspects of the present disclosure, the maximum G' value may also be determined.

The time to achieve the maximum G' may be reflective of fluid aging and initiation of collapse (e.g., gel collapse or poroelastic collapse). In some cases, however, the t(G'=max) value may not be found during a test. For instance, if the fluid/gel was not susceptible to collapse/aging or the collapse takes so long that the test length isn't sufficient, the time value and maximum G' values may not be found. In that case, the decision at 240 may indicate that time was not found and it can be determined at 242 that no collapse is starting to occur. At this point, the process may stop or the test may be repeated (e.g., for a longer period of time).

If, however, the time and/or maximum G values are found at 240, the method 200 optionally moves to determining the time to collapse at 244. In particular, the results of the MAOS test at 240 may be used to determine a sag time that would be observed under other conditions (e.g., under drilling conditions, in a seven-day pressure cell test, etc.).

Figure 3:
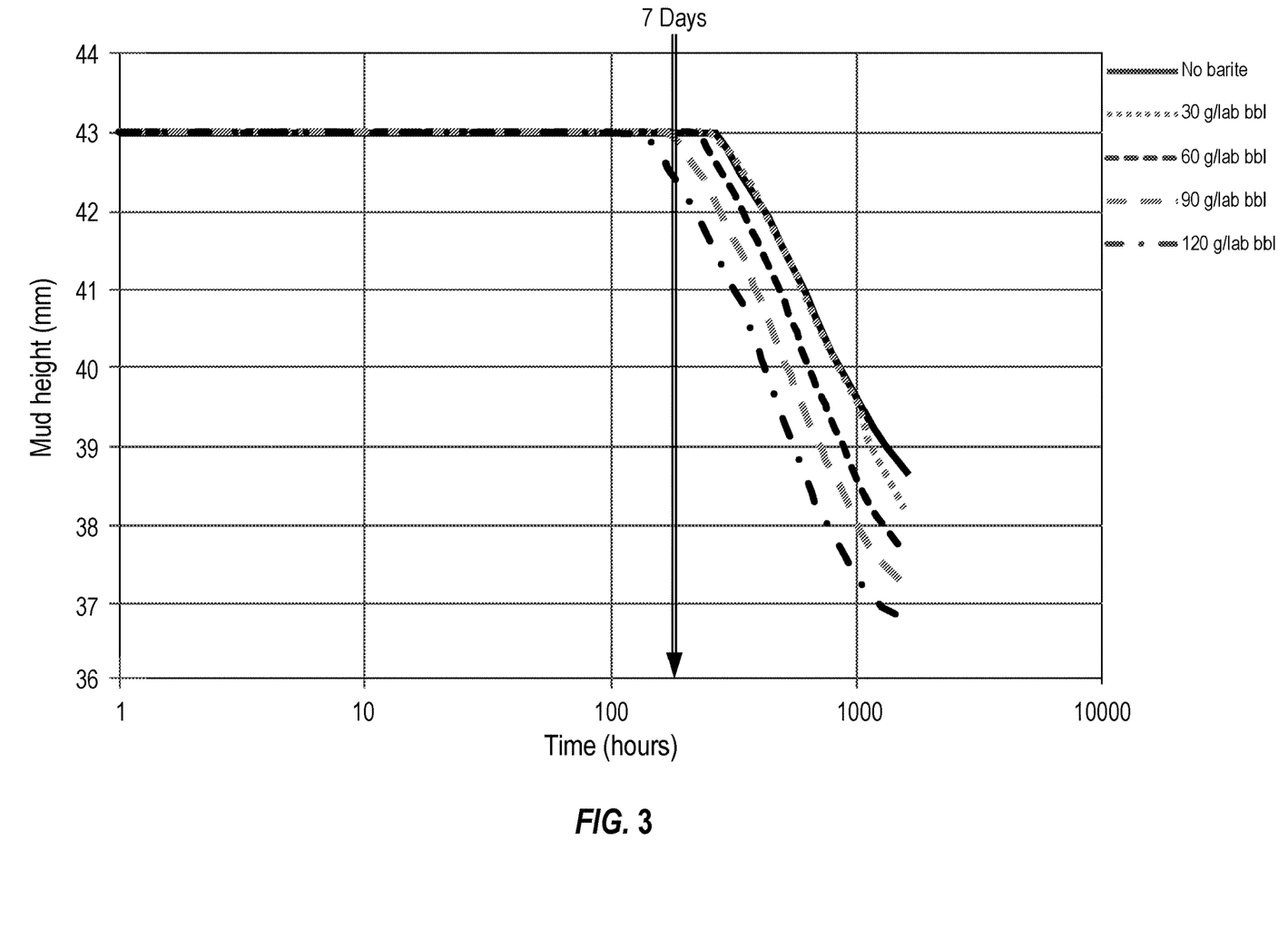
FIG. 3 is a chart from laboratory tests of sag within five fluid samples, over approximately a two-month period.

By way of example, a series of tests may be performed to develop a relationship between the maximum G' value and the sag time. FIG. 3, for instance, shows results of a laboratory test where the collapse of five samples was observed over a time period of approximately 2 months. The results are plotted on a logarithmic scale, with the arrow reflecting the initial 7 days of the test. For the test, the samples had similar chemistry except for the amount of barite, which varied from a control with no barite to a heavy sample with 120 grams per. In this example, a lab barrel was used according to ISO 10416:2008 (API RP 13I) in which a lab barrel is 350 ml.

As seen, despite the differences in barite content, all the samples exhibit a similar pattern of collapse in which no collapse is observed for a period of time, after which collapse increases. In the heavy sample, no collapse was evident until about 5.5 days (130 hours) had lapsed, while the sample with no barite didn't start to collapse until after about 10.5 days (255 hours). The other samples had intermediate delays until the onset of collapse of about 6.5 days (155 hours) for the sample with 90 grams barite per barrel, about 9.5 days (225 hours) for the sample with 60 grams barite per barrel, and about 10 days (240 hours) for the sample with 30 grams barite per barrel. Notably, for a standard test over seven days, only two of the samples would have exhibited any amount of sag, with the 60 g/barrel sample only just starting to show signs of sag.

Significantly, although the samples have different delays until the onset of collapse, once collapse begins, the rate of collapse shown in the logarithmic scale of FIG. 3 is relatively constant, meaning the true rate of collapse is logarithmic. This can be seen by the generally parallel trend lines in FIG. 3. In some embodiments, the shape of the trend line can also be indicative of a type of collapse. For instance, a linear slope on a linear scale may be indicative of poroelastic collapse, while a slope that appears linear on a logarithmic scale may be indicative of gel collapse. Through experimental results, the time delay to collapse (poroelastic or gel collapse) can be correlated with sag, and the peak observed as a function of time can be correlated with the delay time to collapse. This may be observed in SAOS tests, although the use of non-linear oscillation using MAOS accelerates sag, and the non-linear amplitudes in oscillation may (for instance, in a rheometer) accelerate the appearance of the peak in the modulus. Consequently, a determination of the time to peak in elastic modulus during a MAOS test allows defining a correlation to sag, and is inversely related thereto (i.e., longer time to peak indicates less sag). A description of the underlying material science and MAOS data can be found in the attached appendix that is incorporated in and made part of this application.

In a field or laboratory environment, the MAOS measurements can be made using a suitable lab rheometer, although not all rheometers may have such capabilities. Torsional oscillator viscometers can use a torsional resonance that is exploited to recover the viscosity of the surrounding fluid. The physics of such instruments allows the measurement of viscoelastic modulus (G' and G"), but is not generally available in commercial instruments rugged enough for field deployment. In addition, torsional resonance for viscoelastic modulus measurement is not commercially available.

Although the torsional instruments commercially available could be re-interpreted for viscoelastic modulus, they generally do not control the perturbation amplitude and do not have mechanisms available to pre-shear the fluid to provide a reproducible initial state of the fluid. A couette geometry together with the bob as a torsional resonator can be used provide such mechanisms, and an aspect of the present disclosure includes use of a rheometer or modified oilfield rheometer to allow application of perturbations and obtaining of measurements.

In an oilfield rheometer design, the bob may be mounted on a shaft that rotates against a spring in a desired direction that may be clockwise or counter-clockwise. The angular deflection is used to measure the torque. In the anticlockwise direction there may be a stop, and a mechanism can be added that clamps the shaft against the stop such that the shaft becomes the torsional spring for bob resonance. Perturbations to the bob can then be applied to bring the bob into oscillation. This could be via a magnet mounted inside the bob and external coils or any other suitable means such as perturbation of counterweight on extended shaft with the clamp point a nodal point of the system. This latter design allows a pressure seal. The perturbation amplitude could then be controlled so that the deflection amplitude of the bob is at a desired level. This level is chosen by calculating the resulting strain in the sample being tested.

Figure 4:
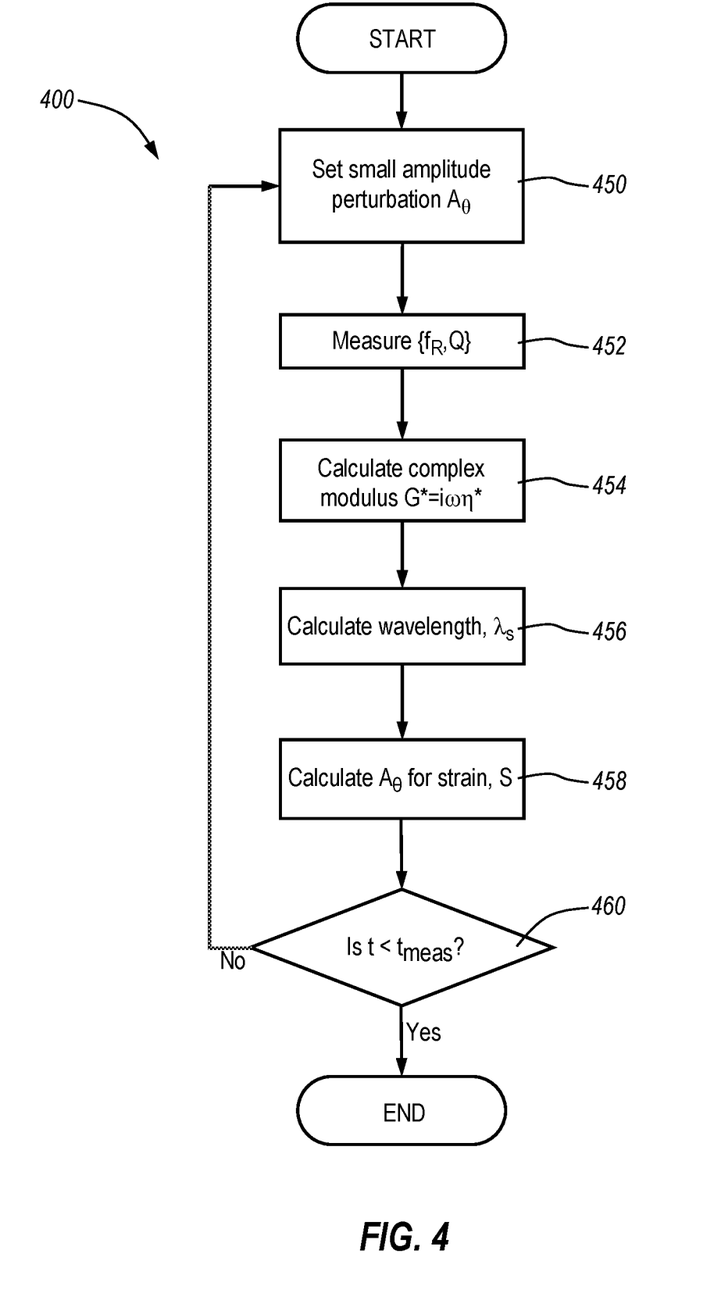
FIG. 4 is a flow chart of a method to keep applied strain amplitude constant during a sag propensity measurement process, according to some embodiments of the present disclosure.

An example of a suitable method 400 for keeping constant strain amplitude during a measurement (e.g., a MAOS measurement) is shown in FIG. 4. In this method, a small amplitude perturbation ($A_\theta$) is set at 450, and a measurement of the resonant frequency ($f_R$) and sharpness (Q) of the resonance frequency can be made at 452. In some embodiments, the sharpness can be calculated or related to the resonance frequency over the width.

The complex modulus G* is calculated at 454. This may be calculated as:

$$G^* = i\omega\eta^* \qquad (1)$$

with G* including G'+G", i being the imaginary number, $\omega$ representing an angular frequency (e.g., in radians/second) of oscillation in the resonance frequency, and $\eta^*$ representing a complex viscosity of the fluid. The complex viscosity may be determined in any suitable manner, including by using existing measurement equipment capable of this measurement.

The wavelength ($\lambda_s$) of a shear wave created by an oscillation (e.g., an oscillating bob) in the fluid may be calculated at 456. An example equation for this calculation includes:

$$\lambda_s = \left(\sqrt{\frac{\rho f}{2\pi|\eta^*|}} \cos\left(\frac{\delta}{2}\right)\right)^{-1} \tan(\delta) = \frac{G''}{G'} = \frac{\eta''}{\eta'}. \qquad (2)$$

Following calculation of the wavelength at 456, the amplitude of the oscillation ($A_\theta$) for the strain (S) can be determined at 458. An example equation for such calculation that also allows determination of the strain using wavelength and amplitude is:

$$A_\theta = \frac{1}{r} S \cdot \frac{\lambda_s}{4}. \qquad (3)$$

If the time (t) is then determined at 460 to be less than a set measurement time ($t_{meas}$), the method 400 can end. Otherwise, the method 400 may return to the act of setting a small amplitude perturbation at 450.

From a mechanical point of view, it may be desirable to have a resonant frequency as high as practical, in order to probe the fluid over a length-scale large enough that allows bulk properties to be measured while the wavelength should be as long as possible. In some embodiments this is greater than 25 µm, 50 µm, 75 µm, 100 µm, 150 µm, or 250 µm. For example fluid properties, a 100 µm wavelength suggests a potential maximum practical frequency of about 1 kHz. Also, the lower the frequency, the larger the perturbation amplitude for a given strain, which may therefore more easily sensed.

In accordance with embodiments of the present disclosure using a torsional oscillator, drive power may be set so that the amplitude of the oscillation can be within a MAOS range (or alternatively in a LAOS or SAOS). The resonant frequency (without damping) can be given by the equation:

$$f = \frac{1}{2\pi}\sqrt{\frac{k}{I}}, \qquad (4)$$

where k is the torsional spring constant and I is the moment of inertia of the torsional component (the bob in the case of the couette arrangement). For an example oilfield rheometer (e.g., GRACE M3600 oilfield rheometer), the shaft and bob combination may resonate between 100 Hz and 150 Hz (e.g., about 130 Hz). It should be noted that the spring constant, k, depends on the shaft as:

$$k = \frac{\pi a^4 G}{2L}, \qquad (5)$$

where G is the shaft material shear modulus (e.g., about 75 to 80 GPa for steel), a is the shaft radius, and L the length of the shaft. Since shaft radius is raised to the power 4, k and the resonant frequency are therefore highly sensitive to the radius of the shaft.

INDUSTRIAL APPLICABILITY

Embodiments of the present disclosure allow for the sag propensity in fluids to be determined. For instance, by using non-linear oscillation measurements, the sag (gel or poroelastic collapse) nature of a fluid can be accelerated and the sag propensity can be determined in a more rapid fashion. To perform such tests, torsional oscillation devices may be used, and can be controllable to allow a displacement amplitude to be selectively controlled, which optionally allows for a constant strain amplitude to be applied during the test. Additionally, by pre-shearing a fluid before all or a portion of a test, the fluid can be prepared for the test and may be brought to a predetermined or other reproducible state. Having fluid in a reproducible state allows for similar measurements to be made and comparisons to efficiently be drawn. Thus, while sag propensity may be determined in an absolute or quantitative fashion, sag propensity may also allow comparisons in a qualitative fashion by comparing different fluids and fluid compositions.

In some embodiments estimating or determining sag propensity of a fluid, and includes providing oscillatory strain to a fluid, and within a MAOS regime. Using the oscillatory strain, an elastic modulus is determined as a function of time, and the elastic modulus or a time to reach peak elastic modulus or a combination is correlated with sag propensity.

In some embodiments, a time to reach peak elastic or complex modulus is inversely correlated with sag, such that greater time is indicative of less sag. In another embodiment, a method includes pre-shearing the fluid before providing the oscillatory strain. Pre-shearing may include stopping pre-shearing of the drilling before providing the oscillatory strain. Pre-shearing additionally, or alternatively, includes pre-shearing the fluid at a high-shear rate over a period of time.

In another embodiment, a method of estimating or determining sag propensity includes determining an elastic or complex modulus did not peak, repeating an evaluation method for a longer time period to obtain the peak elastic or complex modulus. In some embodiments, correlating elastic or complex modulus, or time to reach a peak, includes one or more of determining sag of the fluid or that the fluid has a higher or lower sag propensity relative to a second fluid. Where the fluid is a first fluid, the method may include designing or selecting a fluid composition by repeating the method for a second fluid with a differing composition.

Another example method for evaluating sag propensity includes shearing a drilling fluid and providing an oscillatory strain at an amplitude in excess of a linear region and below a yield strain of the drilling fluid. An elastic modulus of the drilling fluid is determined as a function of time, and from the elastic modulus as a function of time, a time to reach maximum elastic modulus is determined. The time to reach maximum elastic modulus is converted or correlated to a drilling fluid sag propensity for the drilling fluid.

In some embodiments, shearing drilling fluid includes applying a high shear rate for a period of time and stopping before providing the oscillatory strain and/or shearing the drilling fluid until a predetermined initial state of the drilling fluid is achieved. In further example embodiments, the elastic modulus can include G' of a viscoelastic modulus. In some embodiments, the oscillatory strain the perturbation amplitude of the oscillatory strain is controlled. The sag propensity that is determined can include one or more of poroelastic collapse or syneresis.

According to some embodiment, determining a sag propensity can include determining a Y parameter for a drilling fluid and providing an oscillatory strain after determining the Y parameter is greater than a critical Y parameter. When the Y parameter is less than the critical Y parameter, the presence of settling may be detected rather than sag. Additional embodiments include measuring torque during or after providing the oscillatory strain and using the measured torque to determine the elastic modulus.

An example measurement device in accordance with embodiments of the present disclosure includes a driven torsional pendulum. The pendulum can include a shaft and a bob. The bob is designed to be immersed in a fluid and is selectively controllable. For instance, at least a displacement amplitude at a surface of the bob at resonance may be controlled. An optional pre-shearing mechanism, that is independently controllable, is also included and can cause the fluid adjacent the torsional pendulum bob to be sheared at a high rate. Using such a device, strain amplitude imposed on the fluid can be maintained a constant value. From use of the device, a resonant frequency and Q factor of resonance can be measured, and from such measurements, a complex modulus determined.

Embodiments of the present disclosure can be implemented with a variety of different fluids and under various testing and operating conditions. Some examples of suitable methods and fluids are discussed in connection with certain examples included in the appendix incorporated and made part of this application. Other portions of the appendix include background information that may be useful in understanding certain aspects of the present disclosure.

While embodiments disclosed herein may be used in the oil, gas, hydrocarbon exploration or production environments, or in the production of other natural resources, such environments are merely illustrative. Systems, tools, assemblies, methods, devices, and other components of the present disclosure, or which would be appreciated in view of the disclosure herein, may be used in other applications and environments. For instance, creaming is another phenomenon that may be generally opposite sedimentation and is amenable to the same analysis, but considered a gravity-type effect in an upward direction rather than a downward direction. In other embodiments, embodiments of the present disclosure may be used outside of a downhole environment, including in connection with the automotive, aquatic, aerospace, hydroelectric, pharmaceutical, agrochemical, personal care, cosmetics, or manufacturing industries.

Certain descriptions or designations of components as "first," "second," "third," and the like are also used to differentiate between identical components or between components which are similar in use, structure, or operation. Such language is not intended to limit a component to a singular designation or require multiple components. As such, a component referenced in the specification as the "first" component may be the same or different than a component that is referenced in the claims as a "first" component, and a claim may include a "first" component without requiring the existence of a "second" component.

Furthermore, while the description or claims may refer to "an additional" or "other" element, feature, aspect, component, or the like, it does not preclude there being a single element, or more than one, of the additional element. Where the claims or description refer to "a" or "an" element, such reference is not be construed that there is just one of that element, but is instead to be inclusive of other components and understood as "at least one" of the element. It is to be understood that where the specification states that a component, feature, structure, function, or characteristic "may," "might," "can," or "could" be included, that particular component, feature, structure, or characteristic is provided in certain embodiments, but is optional for other embodiments of the present disclosure. The terms "couple," "coupled," "connect," "connection," "connected," "in connection with," and "connecting" refer to "in direct connection with," or "in connection with via one or more intermediate elements or members." Components that are "integral" or "integrally" formed include components made from the same piece of material, or sets of materials, such as by being commonly molded or cast from the same material, in the same molding or casting process, or commonly machined from the same piece of material stock. Components that are "integral" should also be understood to be "coupled" together.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The Abstract at the end of this disclosure is provided to allow the reader to quickly ascertain the general nature of some embodiments of the present disclosure. It is submitted with the understanding that it will not be used to interpret or limit the scope or meaning of the claims.

What is claimed is:

1. A method for characterizing and evaluating a drilling fluid, comprising:
   i) using a rheometer to apply oscillatory strain to the drilling fluid and measure torque while the oscillatory strain is applied to the drilling fluid;
   ii) determining an elastic modulus of the drilling fluid over time based on the torque measured by the rheometer in i);
   iii) determining a time corresponding to a peak magnitude of the elastic modulus of the drilling fluid determined in ii);
   iv) using a correlation to determine a parameter characterizing sag of the drilling fluid from the time corresponding to the peak magnitude of the elastic modulus as determined in iii); and
   v) evaluating the parameter characterizing sag of the drilling fluid as determined in iv) to determine suitability of the drilling fluid for drilling a wellbore.

2. The method of claim 1, further comprising shearing the drilling fluid before applying the oscillatory strain in i).

3. The method of claim 1, wherein the parameter characterizing sag of the drilling fluid represents a sag time.

4. The method of claim 1, further comprising repeating the operations of i) to v) for an additional drilling fluid.

5. The method of claim 4, wherein the additional drilling fluid has a composition different from a composition of the drilling fluid.

6. The method of claim 1, wherein the oscillatory strain is applied in i) by controlling perturbation amplitude.

7. The method of claim 1, wherein the sag of the drilling fluid relates to a tendency of solid particles to settle due to gravity and/or as a result of gel collapse or breakdown due to aging.

8. The method of claim 1, further comprising:
   determining a Y parameter for the drilling fluid; and
   selectively applying the oscillatory strain in i) after determining that the Y parameter is greater than a critical Y parameter.

9. The method of claim 1, wherein the time corresponding to a peak magnitude of the elastic modulus of the drilling fluid as determined in iii) represents a time to reach the peak magnitude of the elastic modulus of the drilling fluid.

10. The method of claim 1, wherein the elastic modulus of the drilling fluid as determined in ii) comprises a complex viscoelastic modulus of the drilling fluid.

11. The method of claim 10, wherein the complex viscoelastic modulus of the drilling fluid is based on angular frequency of oscillation in the oscillatory strain and measured viscosity of the drilling fluid.

12. The method of claim 1, wherein the oscillatory strain applied to the drilling fluid in i) is in a medium amplitude oscillatory shear (MAOS) regime that exists between a small amplitude oscillatory shear (SAOS) regime that produces a linear viscoelastic response and a large amplitude oscillatory shear (LAOS) regime that produces a non-linear viscoelastic response.

13. The method of claim 12, wherein the medium amplitude oscillatory shear (MAOS) regime produces a particular scaling factor for a third harmonic contribution.

14. The method of claim 1, wherein the correlation of iv) is determined from laboratory tests of collapse of a number of drilling fluid samples.

15. The method of claim 1, wherein the rheometer comprises a torsional oscillator configured to apply oscillatory strain to the drilling fluid in i).

16. The method of claim 1, wherein the rheometer comprises an oscillating bob configured to apply oscillatory strain to the drilling fluid in i).

17. The method of claim 1, wherein the rheometer is configured to apply oscillatory strain at a resonant frequency in i).

* * * * *